April 27, 1965     A. C. METZGER ETAL     3,180,152
PRESSURE TRANSDUCER
Filed Feb. 9, 1962     3 Sheets-Sheet 1
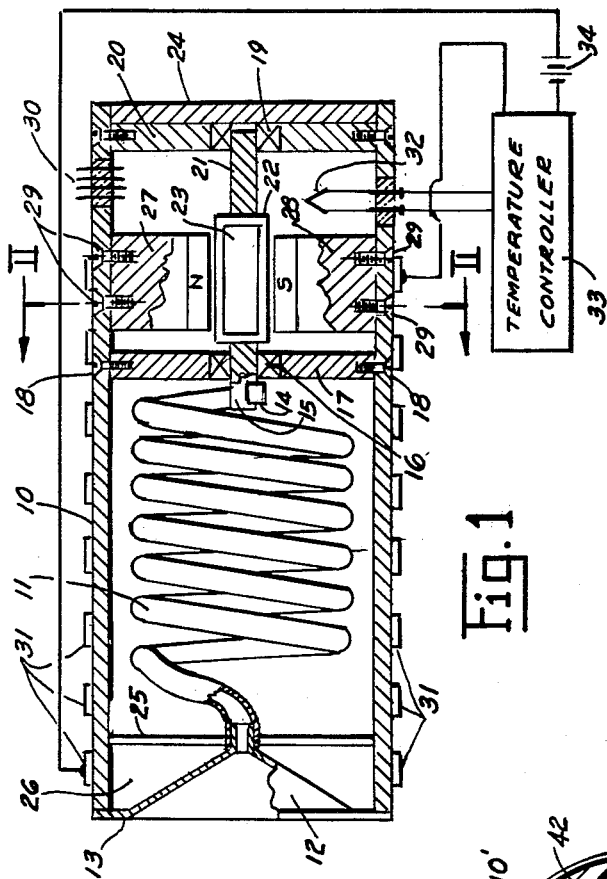
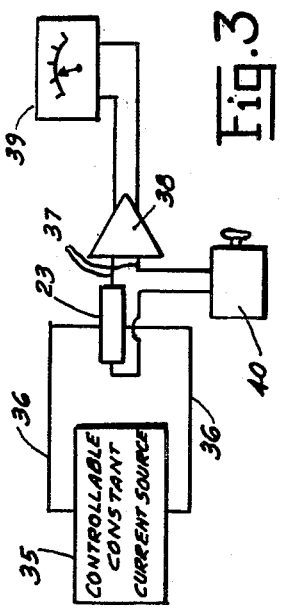
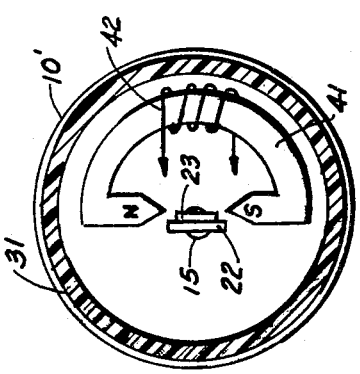
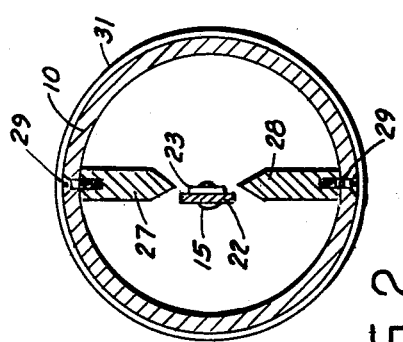
ARTHUR C. METZGER
&
SAUL LISS
INVENTORS
BY RICHARDS & CIFELLI
ATTORNEYS

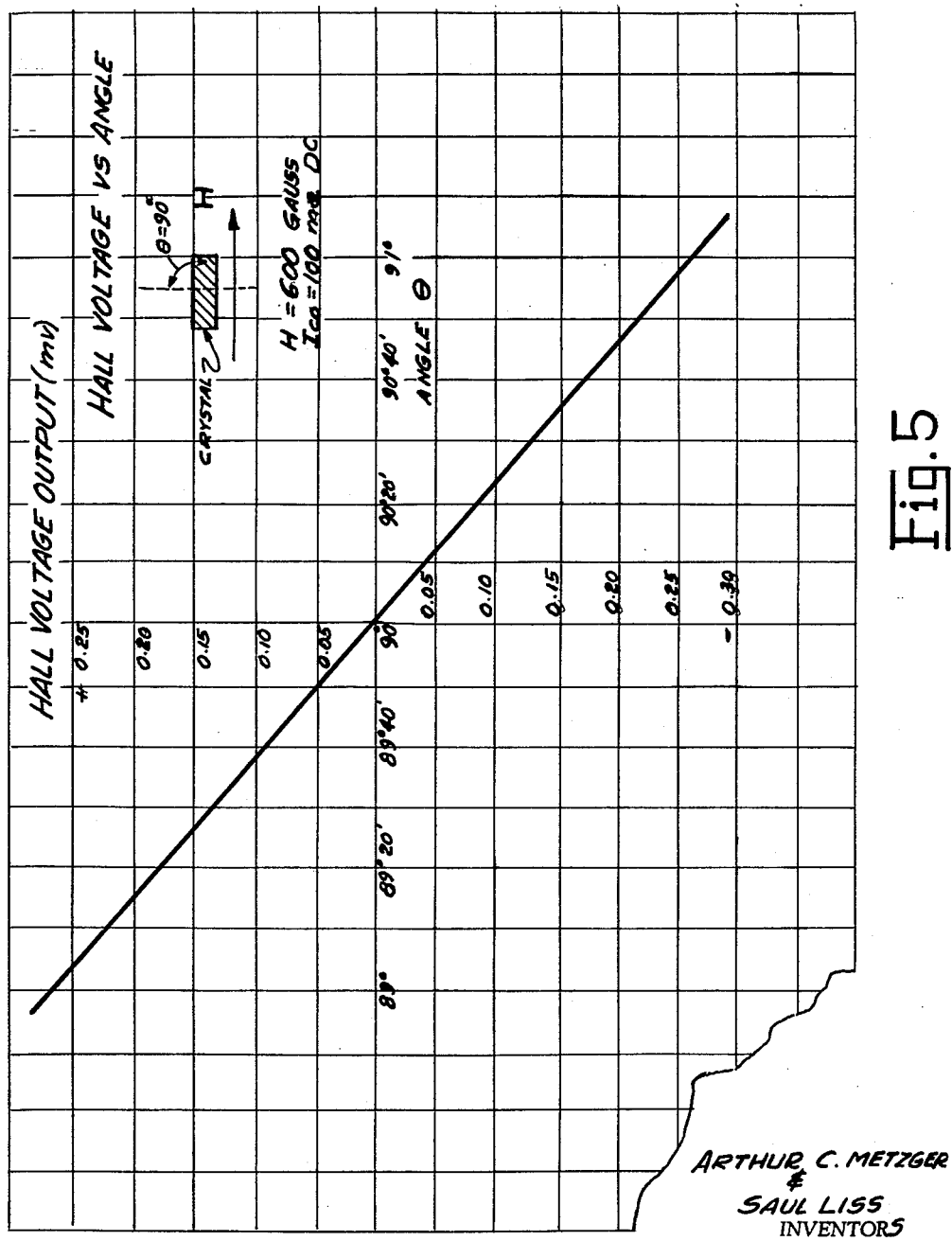

ARTHUR C. METZGER
&
SAUL LISS
INVENTORS

BY RICHARDS & CIFELLI
ATTORNEYS

United States Patent Office 3,180,152
Patented Apr. 27, 1965

3,180,152
PRESSURE TRANSDUCER
Arthur C. Metzger, Verona, and Saul Liss, Fair Lawn, N.J., assignors to Micro Metrics Sales Corporation, Paterson, N.J., a corporation of New Jersey
Filed Feb. 9, 1962, Ser. No. 172,297
3 Claims. (Cl. 73—384)

This invention relates to a pressure transducer and more particularly to an improved arrangement for translating pressure deviations into corresponding electrical variations.

The device to be described in detail hereinbelow is useful in any application wherein it is desired to sense, or measure, pressure variations, and is particularly adapted for use as an altimeter having improved resolution and accuracy. Basically, the device comprises a Bourdon tube pressure sensor for the translation of pressure variations into angular deviations and a Hall generator for the conversion of such angular deviations into corresponding electrical variations for measurement and/or control purposes. In the specific case of an altimeter, a device made in accordance with this invention is capable of sensing atmospheric pressure from sea level to at least 100,000 feet with a resolution of 50 feet and an accuracy of 0.1 percent.

An object of this invention is the provision of an improved transducer for converting pressure variations into electrical variations.

An object of this invention is the provision of a transducer comprising a pressure-sensing element for translating changes in pressure into corresponding angular displacement and means for producing an electrical signal in correspondence with such angular displacement.

An object of this invention is the provision of an altimeter comprising a Bourdon tube disposed within a sealed casing said tube having a restrained open end communicating with the atmosphere and a closed end, said closed end being mechanically coupled to a Hall sensing element and rotatably supported by the casing, and means establishing a unidirectional magnetic field across the Hall element.

An object of this invention is the provision of an altimeter comprising a closed chamber, a helical Bourdon tube having a fixed end communicating with the atmosphere and a freely-rotatable closed end, means restricting the rotation of the said closed end about the axis of the helix, permanent magnet means establishing a constant magnetic flux field across an air gap, and a Hall element disposed within the air gap and rotatable with the closed end of the tube.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is, essentially, a central cross-sectional view of a device made in accordance with this invention;

FIGURE 2 is a sectional view taken along the line II—II of FIGURE 1;

FIGURE 3 is a diagrammatic representation of the electrical system;

Figure 6:
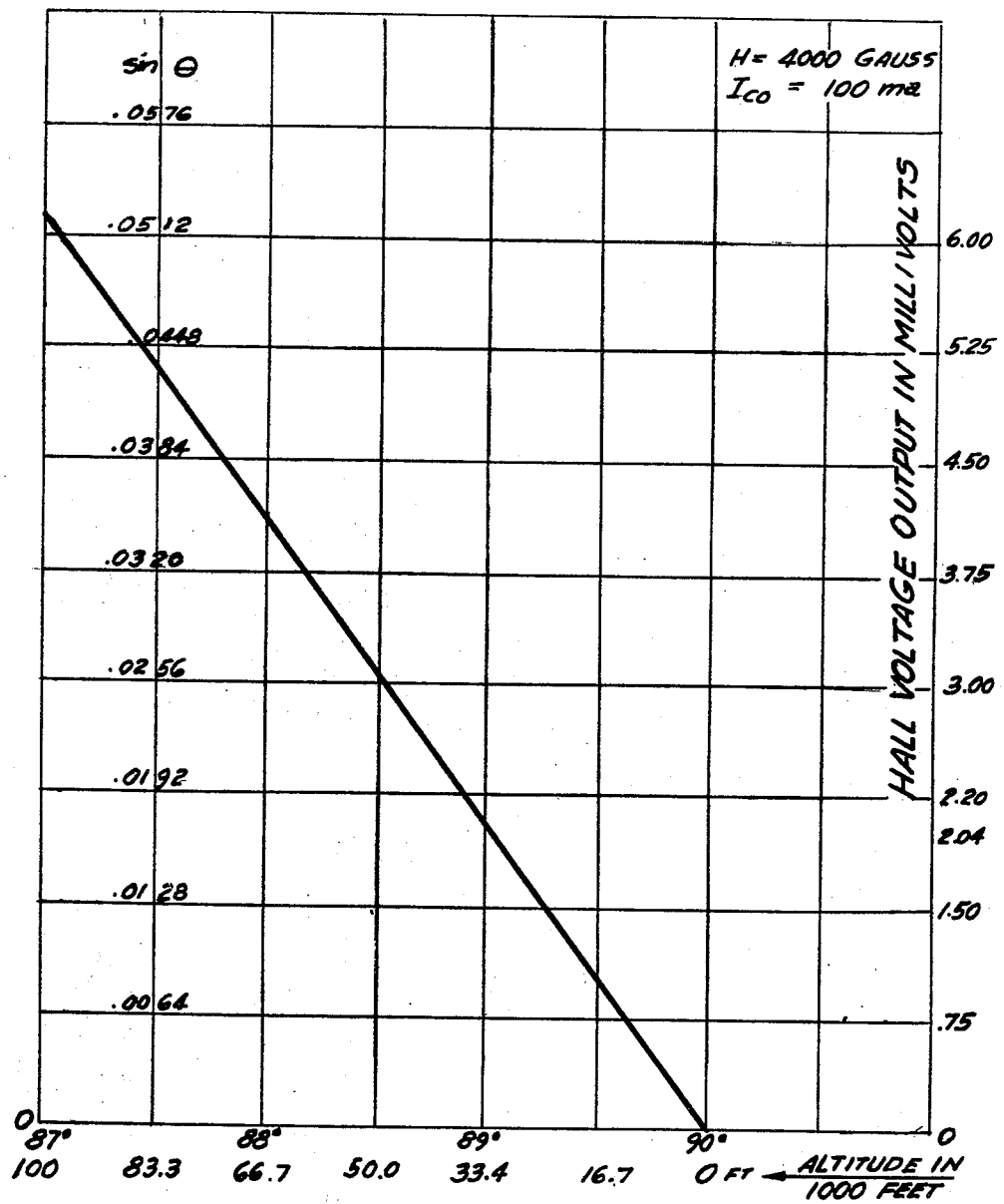

FIGURE 4 generally is similar to FIGURE 2 and showing a modification of the magnetic field producing means;

FIGURE 5 is a curve showing the linearity of the Hall voltage at the null point; and FIGURE 6 is a curve showing the relation between the angular rotation of the Hall sensing element and the developed output voltage.

Reference, now, is made to FIGURES 1 and 2, wherein there is shown a cylindrical case 10, preferably made of soft iron, and housing the helical Bourdon tube 11. The open end of the tube is secured to the base of a funnel 12, as by soldering, said funnel being provided with an integral, peripheral flange 13 which is soldered or otherwise secured to the case, thereby sealing this end of the case from the atmosphere. The closed end 14 of the Bourdon tube is flattened and curved to facilitate the securing thereof to a shaft 15, as by soldering, rotatable in a bearing 16 carried by the plate 17 which, in turn, is secured in fixed position relative to the case as by the screws 18. An aligned bearing 19 is carried by the fixed plate 20 and accommodates a shaft 21. The proximate ends of the aligned shafts 15 and 21 are provided with axial slots receiving the ends of a mounting plate 22 carrying a Hall sensing element 23, which plate is firmly secured to the shafts, as by soldering. The described arrangement is such that pressure changes within the Bourdon tube result in a corresponding angular rotation of the mounting plate 22 about the axis of the case. It may here be pointed out that the expansion and contraction of the tube 11 results predominantly in an angular displacement of the closed tube end 14, accompanied by a small amount of rectilinear movement. Such rectilinear movement is accommodated by sliding movement of the shaft 21 within the bearing 19. A closure plate 24, soldered to the case, completes the sealing of the case. In actual practice, the interior of the case contains dry air or gas at approximately atmospheric pressure. Further, the forward end of the case is divided by a plate 25 thereby forming a plenum chamber 26 to minimize dynamic shocks due to air turbulence.

A conversion of the angular displacements of the closed end of the Bourdon tube into corresponding electrical variations is accomplished by means of the Hall element 23 carried by the mounting plate 22 and disposed between the spaced polar surfaces of aligned, permanent magnets 27 and 28, opposite polar surfaces of the magnets being arcuate and conforming to the inside diameter of the case, whereby the magnets are secured in fixed position by the screws 29. It will be noted that the proximate polar surfaces of the magnets are of tapered form and of opposite polarity. Consequently, a strong, concentrated magnetic flux field is established across the air gap and along the median plane of the magnets and sensing element. The sensing element is a semi-conductor material neatly doped for high electron mobility, such as silicon, germanium, or an alloy such as indium arsenide.

Materials exhibiting the Hall effect have a property such that an electrical potential is produced at laterally spaced points along one axis of the material when a current is passed through an orthogonal axis thereof under the influence of a mutually perpendicular magnetic field. The output potential, or Hall voltage, is generally proportional to the product of the magnetic field strength and the magnitude of the energizing current passed through the body of the semi-conductor material. If the magnitudes of the energizing current and the magnetic field remain constant, the magnitude of the output potential is proportional to the angle between the plane of the magnetic lines of force and the plane of the semi-conductor material corresponding to the direction of the flow of the energizing current therethrough.

The four leads for connecting the Hall sensing element into an appropriate electrical circuit are not shown in the drawing, but it will be understood these are flexible leads connected to a conventional glass-insulated pin terminal 30, as shown in FIGURE 1.

When the case 10 and the closure plate 24 are made of soft iron, the device is shielded from the influence of external magnetic fields and, at the same time, the case forms a return path for the magnetic flux of the two permanent magnets. In consequence, a strong, constant magnetic flux field penetrates through the sensing element along a rather sharply defined plane. If, now, the energizing current caused to flow through the sensing element is constant, the developed output potential of the element will vary solely in accordance with the angular rotation of the sensing element in response to expansion or contraction of the Bourdon tube. The maximum magnitude of such output potential occurs when the magnetic flux field is normal to that surface of the semiconductor through which the energizing current flows, whereas the output potential is zero when the flow of the energizing current flows through the sensing element in a plane parallel to the magnetic field as is the case when the sensing element is in the illustration position.

For practical considerations, we prefer to use a Hall sensing element of the n-type rather than a p-type semiconductor material, inasmuch as electrons have a much higher mobility than holes in a given material, thereby producing a greater output potential. It may also here be pointed out that the temperature stability of the material is increased for semiconductors with large forbidden gaps and by heavily doping the material to increase the concentration of the impurity items. To further stabilize the device, it is desirable to maintain the temperature within the case at a constant level somewhat above the maximum thermal exposure of the device under operating conditions. This is readily accomplished by wrapping a heating tape 31 around the case. The temperature changes within the case are sensed by a thermocouple 32 having leads brought out through electrically-insulated pin terminals to a suitable controller 33 which controls the electric power supplied to the heating tape from a suitable source 34.

As shown schematically in FIGURE 3, a constant energizing current of known magnitude is caused to flow through the sensing element 23 from a controllable current source 35 through the input leads 36. The developed output potential is applied, through the output leads 37, to a suitable amplifier 38, thereby to provide a working level of voltage and power for actuation of a suitable read-out device, as, for example, an electrical indicating instrument 39 having a pointer movable relative to a scale calibrated in units of pressure, altitude or etc. Preferably, suitable means 40 are included in the circuit to manually or automatically correct for changes in barometric pressure.

A modification of the means for producing the magnetic field is shown in FIGURE 4. Here, a C-shaped permanent magnet 41 has tapered polar surfaces spaced from the sensing element 23 and is secured in fixed position within the case in any appropriate manner. In this modification of the invention, the case 10' can be made of a suitable plastic since it is not required to provide a return path for the magnetic flux. Further, a winding 42 on the magnet may be used to provide a bias control for the compensation of equipment errors and temperature and/or atmospheric variations, all for the purpose of maintaining accuracy of calibration of the read-out device.

We have found that the output voltage from the Hall sensing element is extremely linear at the null voltage point, a condition which occurs when the direction of the energizing current flow through the element is in a plane parallel to that of the magnetic flux field. In a condition of exact parallelism, the element output voltage is zero and this voltage increases as the plane of the element is rotated. As a specific example, FIGURE 5 shows the developed output voltage by the Hall element for an angular excursion of ±1 degree. In this case, the Hall element is made of indium antimonide, the magnetic field had a density of 600 gauss and the energizing current had a constant magnitude of 100 milliamperes D.C. It is seen that the Hall voltage for 3,600 arc seconds rotation of the elements is 0.27 millivolt. If, now, the ±1 degree maximum rotation of the sensing element represents 100,000 feet altitude, one arc second of rotation will equal an altitude change of 27.7 feet, that is:

$$\frac{\text{altitude}}{\text{angular arc}} = \frac{100{,}000 \text{ feet}}{3{,}600 \text{ arc seconds}} = 27.7 \text{ feet/arc sec.}$$

Therefore, the Hall voltage ($V_H$) for each arc second of rotation is;

$$V_H = \frac{27.7}{3{,}600} = 0.075 \text{ microvolt/arc sec.}$$

Under this condition, every change of 27.7 feet in altitude provides an output voltage of 0.075 microvolt, or, for every 200 feet change in altitude $V_H = 0.542$ microvolt.

If, however, the maximum angular rotation of the sensing element is limited to 3 degrees (instead of 1 degree) and the magnetic flux density is increased to 4,000 gauss (instead of 600 gauss), the developed Hall output voltage is obtained from the projected curve of FIGURE 6, and we obtain;

$$\frac{\text{altitude}}{\text{angular arc}} = \frac{100{,}000}{10{,}800} = 9.26 \text{ feet/arc sec.}$$

and $V_H = 1.62$ microvolts/200 feet altitude.

It is here pointed out that the curves of FIGURES 5 and 6 were obtained, under the specified conditions, by using a Hall sensing crystal having a maximum output voltage of $V_H = 16.25$ millivolts. It is posisble to obtain a maximum output voltage, $V_H = 115$ millivolts and larger by using a proper semi-conductor material operating in a magnetic field having a flux density of 4,000 gauss and an energizing current of 100 milliamperes. This would, then, through interpolation, give, for a 3 degree element rotation, an output voltage $V_H = 11.5$ microvolts/200 feet altitude, a magnitude which can readily be amplified by conventional solid state circuitry with a high signal to noise ratio.

Even on an ultra conservative design basis, it readily is possible to design the helical Bourdon tube to provide a 3 degree top angle deflection (rotation of the sensing element) for a pressure change corresponding to 100,000 feet altitude. The standard formula for calculating the angular deflection ($\Delta a$) of a helical Bourdon tube having one restrained end is, $$\Delta a = K \frac{aP}{E} \int (A, B, t, R)$$

where $K$ = a constant,
$a$ = total angle subtended in degrees,
$P$ = differential pressure in p.s.i.,
$E$ = modulus of elasticity of the material,
$A$, $B$ = cross section of the tube length and width in inches,
$t$ = thickness of the tube in inches, and
$R$ = radius of curved tubing in inches.

Thus:

$$\Delta a = \frac{KaP}{E}\left(\frac{R}{t}\right)^x \left(\frac{A}{B}\right)^y \left(\frac{A}{t}\right)^z$$

where $x$, $y$, $z$ and $K$ are all constants.

Selecting conservative values for each of the above factors, namely, $K = 0.0005$ $x = \frac{1}{10}$ $y = \frac{1}{3}$ $z = 3$
$E = 16 \times 10^6$
$a = 2.5$ turns $= 900$ degrees
$t = .005$ inch.
$P = 15$ p.s.i.
$R = 0.5$ inch
$A, B = 0.025$ square inch, Then, $$\Delta a = \frac{(.0005)(900)(15)}{15 \times 10^6} \frac{(.5)^{\frac{1}{10}}}{.005} \frac{(.5)^{\frac{1}{3}}}{.025} \frac{(.5)^3}{.005}$$

$$= \frac{0.45}{10^6} (10^2)^{\frac{1}{10}} (25)^{\frac{1}{3}} (10^2)^3$$

$$= (0.45)(2)(2.924)$$

$$= (.5)(2)(3) = 3 \text{ degrees of tip angle deflection}$$

The maximum sensitivity ($S_{max.}$) for a minimum tube thickness ($t$) is:

$S_{max.} = 0.01\%$ of maximum differential pressure, $$= 0.01\% (15 \text{ p.s.i.}) \frac{15}{100} \times .01 \; .0015 \text{ p.s.i.}$$

$$= 1 \text{ part per } 1,000$$

The torque gradient (TG) is the moment of force applied at the tube tip perpendicular to the direction of motion multiplied by the distance from the center of rotation, required to give one angular degree of rotation. The torque gradient increases with pressure rating for similar tubes, $$TG = C \frac{P}{\Delta a}$$

where $TG =$ torque gradient in lb.-inches, per degree at deflection,
$C =$ torque gradient constant $= 1$ for any design,
$P =$ differential pressure in p.s.i.,
$\Delta a =$ angular deflection of tube tip in degrees.

Thus, $$TG = 1 \frac{15}{3} = 5 \text{ lb.-in./degree deflection}$$

Therefore, it would require a loading of 5 lb.-inches on the Bourdon tube tip to generate an angular error of 1 degree at a maximum pressure of 15 p.s.i.

If, now, we consider a minimum pressure condition of 1 minimum part input based upon a range of $$\frac{500}{1} \text{ or } 0.03 \text{ p.s.i.}$$

for the same torque gradient (TG) and constant (C), then $$TG = C \frac{P}{\Delta a}$$

$$5 = \frac{.03}{\Delta a}$$

or $$\min. \Delta a = \frac{.03}{5} = .006$$

degree angular change (21.6 seconds of arc) for a change of 0.03 p.s.i.

This is a conservative minimum since the constants (K) and (x) can easily be selected to provide an increase of one order of magnitude for minimum ($\Delta a$), whereby min. $\Delta a = 0.06$ degree for a change of 0.03 p.s.i.

The resolution, accuracy and hysteresis of the device are effected by the temperature coefficient of expansion of the various materials. For this reason, we are careful to select materials having the same expansion coefficient whereby all thermal linear deviations are proportional to the static conditions and predictable. Toward this end, we also prefer the use of the heating tape and control apparatus thereby not only to eliminate the adverse effects of ambient temperature changes, but also to minimize thermal gradients within the device.

As stated hereinabove, the use of a Bourdon tube restrained at one end and motionally free at the other end exhibits both rotary and rectilinear displacement in response to pressure changes within the tube. By capturing the free end of the helix by means of the freely-rotatable shaft, the axial displacement of the helix is accommodated with a minimum retarding effect upon the angular displacement thereof. The electrical effect of such longitudinal shift along the helix axis is minimized by shaping the polar faces of the magnets as described. Inasmuch as the longitudinal shifting of the Hall element occurs within the magnetic flux field developed by the magnets, the element experiences no effective flux change and, therefore, there is no change in the magnitude of the developed output voltage. However, any rotary motion of the sensing element produces a Hall voltage ($H_v$) in accordance with the relationship $$H_v = K I_c B \sin \theta$$

where $K =$ the Hall coefficient of the material in volt-cm./ampere gauss,
$I_c =$ energizing current in amperes,
$B =$ flux density of the magnetic field, and
$\theta =$ angle between the plane of the magnetic field and the sensing element.

Having now described the invention in detail, those skilled in this art will now find no difficulty in making changes and modifications to facilitate the manufacture of the device and/or to adapt the device to specific applications. It is intended that such changes and modifications shall fall within the scope and spirit of the invention as recited in the following claims.

We claim:
1. An altimeter comprising,
    (a) a sealed housing,
    (b) a helical Bourdon tube disposed within the housing, said tube having an open end to the atmosphere and a closed end falling substantially on the tube axis,
    (c) supporting means mounted for rotation about the said tube axis, and mechanically coupled to the closed end of the tube,
    (d) means forming a magnetic flux gap intersecting the tube axis,
    (e) a Hall element disposed in said flux gap and carried by the supporting means,
    (f) read-out means energized by the output voltage of the Hall element and calibrated in factors related to altitude,
    (g) said magnetic flux gap comprising a pair of permanent magnets having spaced polar surfaces of opposite polarity and tapered form thereby producing a sharply-defined magnetic field in the flux gap, and
    (h) a plenum chamber at the end of the housing remote from the closed end of the Bourdon tube.
2. An altimeter comprising,
    (a) a cylindrical housing sealed from the atmosphere,
    (b) a helical Bourdon tube substantially co-axially disposed within the housing, said tube having an open end and a closed end,
    (c) a funnel carried by the housing, said funnel being open to the atmosphere and having its apex connected to the open end of the Bourdon tube,
    (d) partition means dividing the interior of the housing into two chambers at the apex of the funnel,
    (e) a bearing carried by the housing concentric with the axis of the tube,
    (f) a shaft having an end rotatable in said bearing and the other end secured to the said closed end of the tube, (g) a Hall element secured to the closed end of the tube and disposed substantially on the tube axis, (h) a pair of permanent magnets secured in fixed position within the housing, said magnets having spaced polar surfaces of opposite polarity to form a flux gap which is intersected by the Hall element, (i) means maintaining the temperature within the casing at a predetermined level, (j) circuit elements causing an energizing current of constant magnitude to flow through the Hall element, and (k) means responsive to the output voltage developed by the Hall element.

3. The invention as recited in claim 2, wherein the housing is made of magnetic material and forms a return path for the magnetic flux of the magnets, and wherein the Bourdon tube, funnel and shaft are made of material having substantially the same temperature coefficient of expansion.

References Cited by the Examiner
UNITED STATES PATENTS

| | | | |
|---|---|---|---|
| 2,536,805 | 1/51 | Hansen | 307—88.5 |
| 2,593,339 | 4/52 | Ostermann et al. | 73—398 X |
| 2,680,779 | 6/54 | Anderson | 73—398 X |

RICHARD C. QUEISSER, *Primary Examiner.*

ROBERT EVANS, *Examiner.*